(12) United States Patent
Su

(10) Patent No.: US 12,131,426 B2
(45) Date of Patent: Oct. 29, 2024

(54) MEASUREMENT ACCURACY ENHANCEMENT BY USING DYNAMIC REGIONAL MESH SUBDIVISION

(71) Applicant: STREEM, LLC, Portland, OR (US)

(72) Inventor: Huapeng Su, San Jose, CA (US)

(73) Assignee: STREEM LLC, Portland, OR (US)

( * ) Notice: Subject to any disclaimer, the term of this patent is extended or adjusted under 35 U.S.C. 154(b) by 117 days.

(21) Appl. No.: 17/878,765

(22) Filed: Aug. 1, 2022

(65) Prior Publication Data

US 2023/0290068 A1 Sep. 14, 2023

Related U.S. Application Data

(60) Provisional application No. 63/318,680, filed on Mar. 10, 2022.

(51) Int. Cl.
| | |
|---|---|
| *G06T 15/30* | (2011.01) |
| *G06T 7/13* | (2017.01) |
| *G06T 7/62* | (2017.01) |
| *G06T 17/20* | (2006.01) |

(52) U.S. Cl.
CPC ............ *G06T 17/205* (2013.01); *G06T 7/13* (2017.01); *G06T 7/62* (2017.01); *G06T 2200/24* (2013.01); *G06T 2210/56* (2013.01)

(58) Field of Classification Search
CPC .......... G06T 17/205; G06T 7/13; G06T 7/62; G06T 2200/24; G06T 2210/56; G06T 17/20; G06T 15/04; G06T 15/005; G06T 11/40
USPC ........................................................ 345/423
See application file for complete search history.

(56) References Cited

U.S. PATENT DOCUMENTS

| | | | | |
|---|---|---|---|---|
| 6,191,796 B1* | 2/2001 | Tarr | ..................... | G06F 3/04815 |
| | | | | 345/581 |
| 2020/0236346 A1* | 7/2020 | Kato | ...................... | G06F 3/017 |
| 2021/0090322 A1* | 3/2021 | Hunt | ...................... | G06F 3/012 |
| 2021/0142497 A1* | 5/2021 | Pugh | ..................... | G06T 19/006 |

\* cited by examiner

*Primary Examiner* — Gordon G Liu
(74) *Attorney, Agent, or Firm* — Schwabe Williamson & Wyatt

(57) ABSTRACT

A mesh model of a 3D space is provided with improved accuracy based on user inputs. In one aspect, a triangle face of the mesh is divided into three smaller triangle faces base on a user-selected point in a 3D space. A user can select the point on a display screen, for example, where a corresponding vertex in the mesh is a point in the mesh which is intersected by a ray cast from the selected point. This process can be repeated to provide new vertices in the mesh model which more accurately represent an object in the 3D space and therefore allow a more accurate measurement of the size or area of the object. For example, the user might select four points to identify a rectangular object.

21 Claims, 9 Drawing Sheets

MEASUREMENT ACCURACY ENHANCEMENT BY USING DYNAMIC REGIONAL MESH SUBDIVISION

PRIORITY CLAIM

This application claims the benefit of U.S. provisional patent application No. 63/318,680, filed Mar. 10, 2022, titled "Measurement Accuracy Enhancement By Using Dynamic Regional Mesh Subdivision," and incorporated herein by reference.

TECHNICAL FIELD

The present disclosure relates to the field of photogrammetry, and specifically to the generation of a mesh model of a three-dimensional (3D) space from captured images and depth data.

BACKGROUND

Devices such as smartphones and tablets are increasingly capable of measuring and/or computing depth data of images or videos they capture, which in turn are useful for supporting augmented reality (AR) and/or other applications involving 3D spaces. These captured images or video and derived or captured depth data may be processed using various algorithms to detect features in the video, such as planes, surfaces, faces, and other recognizable shapes. These detected features, combined in some implementations with data from depth sensors and/or motion information captured from motion sensors such as a Micro-Electro-Mechanical System (MEMS) gyroscope and accelerometers, can be used by software in creating a point cloud in a 3D space. A 3D mesh representation of the point cloud can in turn be obtained to represent the 3D space more efficiently. The 3D mesh include vertices which represents boundaries of real objects in the 3D space. The point cloud or 3D mesh enables operations such as measurements of physical dimensions of the real objects.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
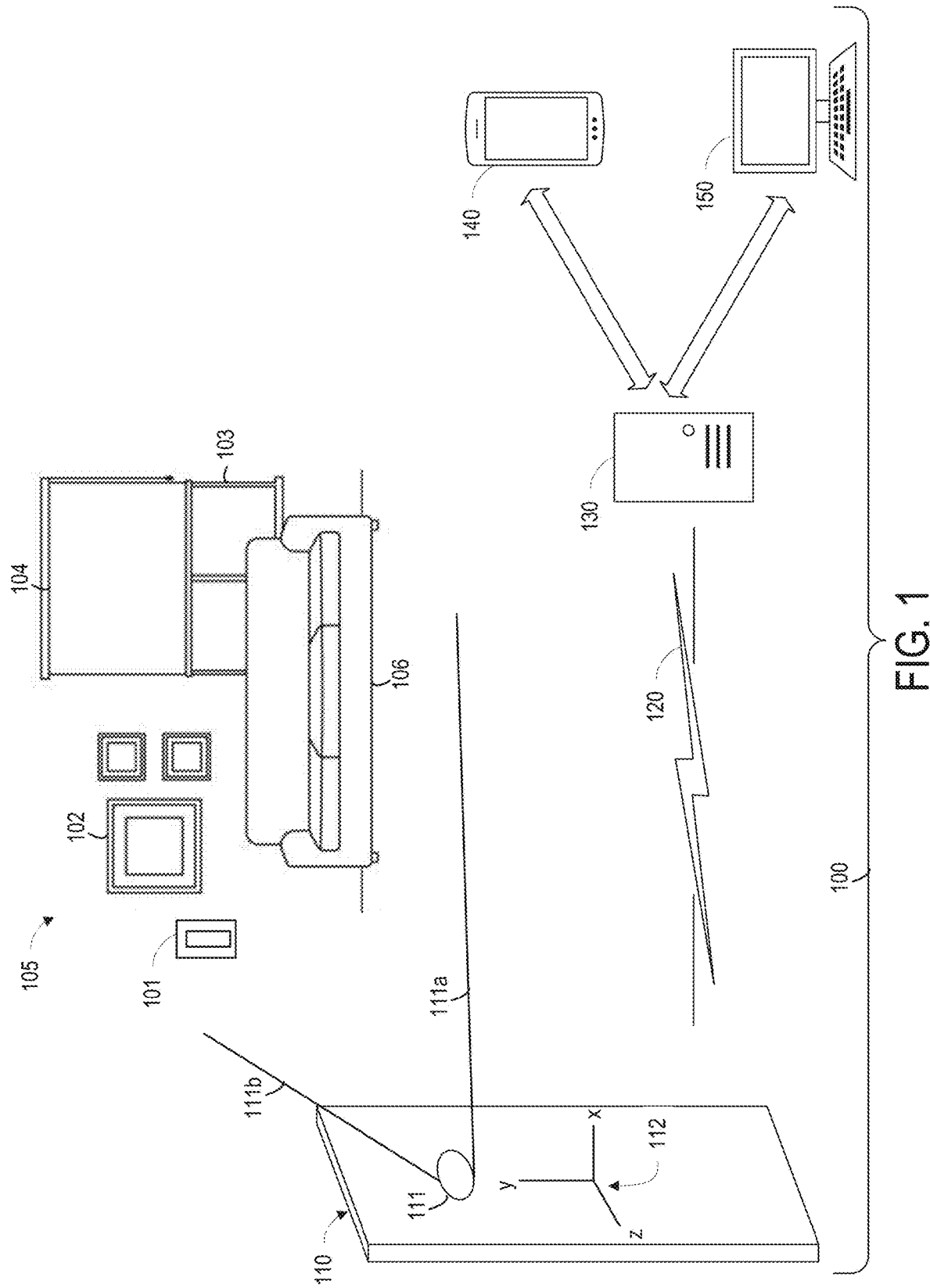
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

People increasingly rely upon remote communications technology to interact with each other. Modern smartphones, as well as camera-equipped laptops and desktop computers, can support the exchange of video data, to allow video chat as well as remote collaboration tools. For example, video conferencing can be blended with screen sharing and collaborative editing tools to allow a group of people who are remote from each other to collectively work on a document or other project over a video link.

As communications technology continues to advance, modern systems can additionally capture and/or transmit spatial data associated with video and audio. Systems can derive spatial data using various photogrammetric techniques, through which 3D spatial relationships can be ascertained. Depending upon the capabilities of a capturing device, depth data may be directly measured or calculated on the fly from captured video, possibly in conjunction with spatial position sensors in the capturing device. For example, most modern smartphones are equipped with an array of sensors beyond cameras and microphones; a modern smartphone may also include depth sensing, such as a Light Detection and Ranging (LiDAR) imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, the array of sensors allow for the relatively accurate capture and/or calculation of depth information for a captured scene.

This depth information can be provided as a point cloud, in one approach. The point cloud in turn can be used to construct a mesh representation or model of a 3D space. The mesh representation is obtained by repeatedly connecting sets of three depth points or vertices together with edges to form a mesh of triangles that approximates the 3D space from which the depth information was obtained. The number of vertices can be less than the number of points in the point cloud so the depth information can be represented more compactly.

The depth information may be obtained by using a suitably equipped device to scan or capture the 3D space. For example, the device may include a camera capable of capturing still or video images, and depth scanning sensors. The device can be static or moved such as by panning to capture a portion, or a 360 degree view, of the space. Further, because the position of the capturing device within the 3D space can be known relative to the depth data and determined with respect to each successive frame of video simultaneously captured by the device, extracted video frames can be mapped onto the 3D mesh to create a relatively realistic approximation of the 3D space.

For example, a user in their home may capture images of cabinets and appliances in their kitchen, or images of furniture, wall hangings and other decor in a living room, for use in planning a remodeling or redecorating project.

However, the 3D mesh may not accurately identify the various objects. This is especially true for objects such as wall hangings, e.g., pictures and light switches, which are attached to a wall, or doors and windows which may be essentially coplanar with a wall, and therefore at the same distance from the camera.

This problem can be understood by considering a triangular mesh in which the surface geometry of the objects is represented by triangular faces. Each triangle is defined by three vertices and the three edges that connect the vertices. Because of a limited storage capacity, the number of triangles is limited. As a result, the vertices of the mesh may not correspond to the edges, corners or other features of the objects.

This results in inaccuracies when obtaining measurements of the objects. Obtaining a measurement generally involves selecting points in the 3D space where, most of the time, these points fall on the middle of the triangle face plane and not exactly on a vertex. One approach is to choose the nearest vertex from the selected point. However, this results in inaccuracies. See, e.g., FIG. 5. Another approach is to compute the point position relative to the vertices of the triangle face. However, this results in overhead data costs. Another approach is to increase the number of triangles to provide a greater resolution throughout the mesh model. However, this increases storage requirements and complexity without significantly increasing the accuracy with which the mesh represents an object.

The techniques described herein address the above and other issues. In one aspect, a triangle face is divided into three smaller triangle faces base on a selected point in a 3D space. A user can select the point on a display screen, for example, where a corresponding vertex in the mesh is a point in the mesh which is intersected by a ray cast from the selected point. The selected point is therefore a join vertex of these three smaller triangle faces. This process can be repeated to provide new vertices in the mesh model which more accurately represent an object in the 3D space and therefore allow a more accurate measurement of, and modelling of, the object. For example, the user might select four points to identify a rectangular object.

The measurement can be a straight line or curved line distance between vertexes, for example, based on the shape of the mesh model. The technique enhances measurement accuracy by allowing measuring of a surface (curve) distance, because the selected point is a vertex of the mesh which has geometric connectivity among vertices.

The techniques are also able to measure the area of one or more triangles or other polygons from the selected points.

In another aspect, new vertices can be added to the mesh where a straight or curved line between two new vertices intersects edges of existing triangles of the mesh.

Another aspect involves automatically identifying points of interest, e.g., corner points of objects, and subdividing the regional triangle faces corresponding to those points.

In another aspect, an edge detection process for an object can be guided by the user-selected points.

As a result, instead of relying on vertices on the mesh which commonly do not have much measurement meaning since they do not closely track the features of the real world object, the techniques provide user-selected or guided vertices. The technique allows a user to intuitively evaluate and select points of interest in the 3D space.

With these techniques, the requirement for data from the input mesh (e.g., point cloud/feature points) is relatively low. Moreover, the techniques benefit from using context/high definition (HD) texture. The techniques have low computational complexity and can be performed dynamically (e.g., upon request). The points can be created or removed regionally within the mesh. The techniques can be used to improve the accuracy of measuring a surface (curve) distance as well as a point-to-point (straight line) distance.

In another aspect, the new vertices added to the mesh by a user at their home or other location can be communicated to a remote device such as a server. A user of the remote device also has the option to select a point in the 3D space. A mesh model at the server can be synchronized with a mesh model at the user local device with the communication of relatively little data. In particular, an update to a local, small region of the mesh can be communicated in a fast, lightweight process.

The above and other benefits will be further understood in view of the following.

FIG. 1 illustrates a block diagram of the components of a system 100 for capturing an image and corresponding AR data, according to various embodiments. The system 100 may include a user device 110, e.g., a capturing device, such as a smartphone, tablet, desktop or laptop computer, two-in-one (a portable computer that includes features of both tablets and laptops), hybrid, wearable computer such as smart glasses or a smartwatch, or any other computing device that can accept a camera and provide positional information, as will be discussed in greater detail herein. The device may be implemented as a computer device 1200 such as discussed in connection with FIG. 12. User device 110 further may include a camera 111 and a spatial position sensor 112 (depicted by a series of axes), which provides information about the spatial position of camera 111. It will be understood that camera 111 and spatial position sensor 112 may be contained within the body of device 110, as depicted in this example. Camera 111 is used to capture the surrounding environment of device 110, and by extension, the user. The camera can capture images of the space 105 within a field of view represented by boundary lines 111a and 111b. The environment may be a 3D space 105 such as a room, and may include one or more three-dimensional objects. In this example, the 3D space is a room which includes objects such as a wall light switch object 101, a frame picture 102 (e.g., a wall hanging), a window 103, a shade 104 for the window and a sofa 106.

Camera 111 may be any camera that can provide a suitable video stream for the intended purpose of user device 110. Where user device 110 is implemented as a smartphone or tablet, camera 111 may be one or more built-in cameras. In other embodiments, such as where user device 110 is a laptop, camera 111 may be built in or may be a separate, external unit. A suitable video stream may be a digital video stream, and may be compressed in embodiments using Advanced Video Codec High Definition (AVC-HD), H.264 (also known as MPEG-4 Part 10, Advanced Video Coding), MPEG-4, or another suitable compression scheme. Camera 111 may be configured to output standard or high-definition video, 4K video, or another resolution of video suitable for the intended purpose of camera 111 and user device 110. In other embodiments, the camera 111 of user device 110 may comprise multiple cameras or similar sensors, where one or more of the sensors may be configured to directly detect depth points, such as a 3D camera, LiDAR, or other suitable depth-sensing technology. In such embodiments, a point cloud of any space captured by camera 111 may be able to be at least partially obtained via direct measurement from the depth-sensing technology.

Spatial position sensor 112 may be configured to provide positional information about camera 111, such as the cameras pan and tilt. Other measured positional vectors may include camera movements, such as the camera rising or falling, or moving laterally. Spatial position sensor 112 may be implemented with micro or MEMS sensors, such as gyroscopes to measure angular movements and accelerometers to measure linear movements such as rises, falls, and lateral movements. In other embodiments, spatial position sensor 112 may be implemented using any suitable technology capable of measuring spatial movements of camera, including but not limited to depth sensors of the camera 111. In some embodiments, spatial position sensor 112 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 130, with which user device 110 communicates via a communication channel 120. Central server 130 may act to receive information from user device 110 such as video and depth data, which may be used with process flow 200 or method 300, discussed below. In some embodiments, user device 110 may handle processing of video and depth information for a captured 3D space, including generation of a metaverse (a virtual-reality space in which users can interact with a computer-generated environment and other users), 3D mesh, and/or layout and estimation of measurements. However, depending upon the specifics of a given implementation, central server 130 may instead carry out some or all processing of the video and depth data to generate a spatial layout and estimation of dimensions of a 3D space captured by the user device 110. User device 110 may either handle a part of the processing, or simply act to acquire data about a 3D space and provide raw or partially processed data to central server 130 for further processing.

Also shown in system 100 are one or more additional user devices 140 and 150, which may be smartphones, tablets, laptops, desktops, or other servers. These additional user devices 140 and 150 may also be in data communication with the central server 130, and so may receive raw or processed data captured by user device 110 and/or a completed layout and estimation of measurements of the 3D space captured by user device 110. User devices 140 and/or 150 may be capable of interaction with the layout and estimations, as well as a generated 3D mesh or metaverse, received from central server 130. Further still, user devices 140 and 150 may engage in two-way or multi-way interaction with user device 110 through central server 130, with each device commonly working with a generated 3D mesh, metaverse, 2D or 3D layout, and/or estimates of spatial dimensions of the metaverse. It should be understood that devices 140 and 150 are merely examples, and are not indicative of the number or type of devices connected to central server 130; a given implementation may have an arbitrary number of devices connected to central server 130.

User device 110, as mentioned above, is in data communication 120 with central server 130, along with user devices 140 and 150. Data communication 120 may be implemented using any suitable data communication link technology, which may be wired, wireless, or a combination of both. Example communications technologies are discussed below with respect to FIG. 12.

Figure 2:
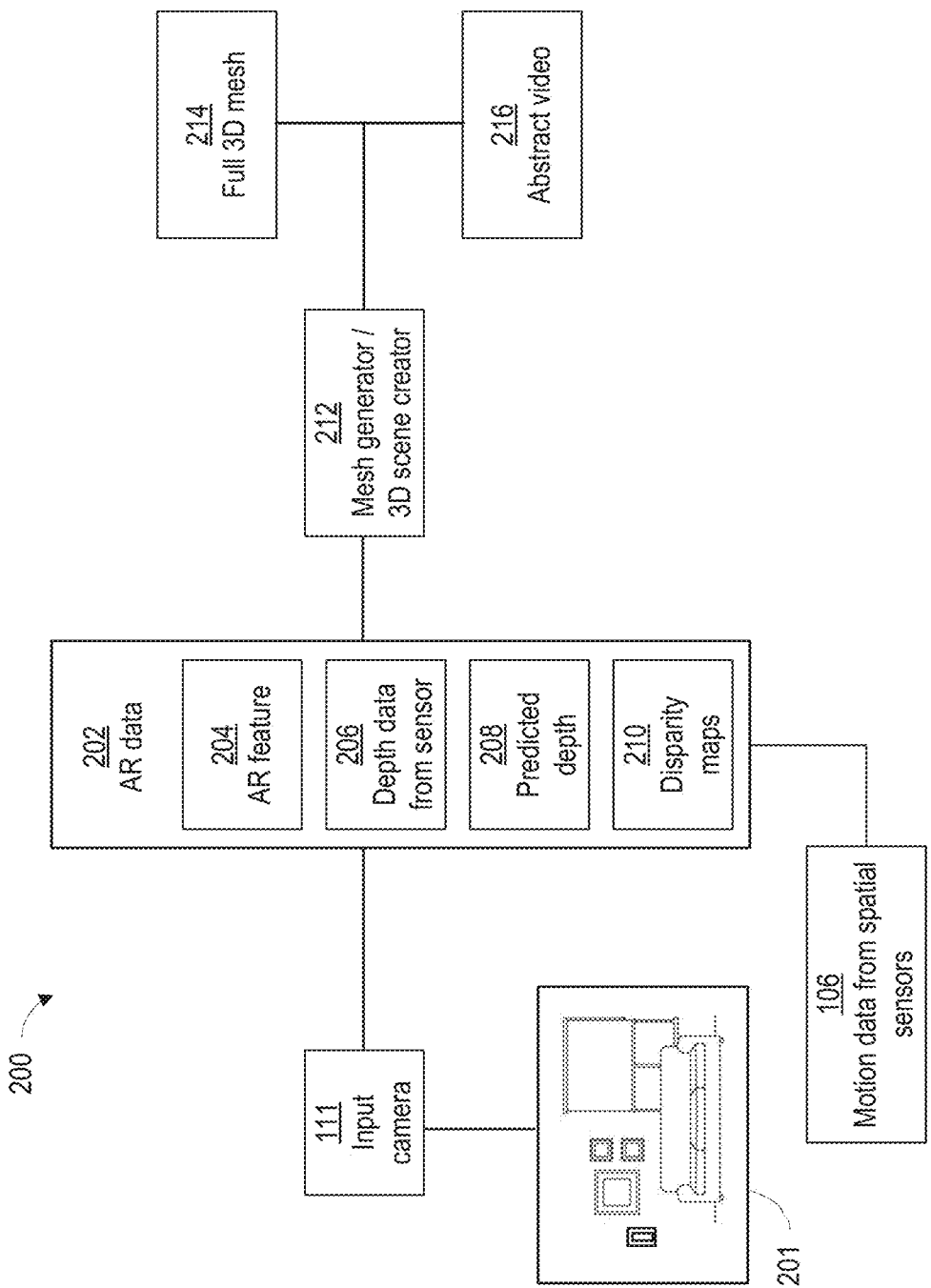
FIG. 2 depicts an example high-level process flow for generating a 3D mesh and virtual reconstruction from a captured video and associated AR data, according to various embodiments.

FIG. 2 depicts an example high-level process flow for generating a 3D mesh and virtual reconstruction from a captured video and associated AR data, according to various embodiments. Process flow 200 may be carried out by one or more components of the system 100, in various embodiments. Initially, a video 201, or one or more images, such as an image of the space 105 of FIG. 1, is captured by an input device, such as the camera 111, along with associated motion data (not depicted). This video 201 is then, in embodiments, partially or wholly processed by the AR application programming interface (API) of the capturing device to generate AR data 202, which may be tagged to the video 201. Examples of an AR API include ARKit, an augmented reality (AR) development platform for iOS mobile devices developed by Apple Inc., and ARCore, a platform for building augmented reality experiences developed by Google LLC.

Note that, as used herein, AR data 202 is not data about AR objects. Rather, AR data 202 includes point cloud data that corresponds to video 201 that may be useful to create a 3D mesh of the captured 3D space, as well as other useful analysis, such as plane detection and semantic segmentation. Furthermore, in some embodiments, the AR API of the capturing device may include semantic segmentation as part of AR data 202.

This AR data 202 may then be used to generate a layout and/or metaverse or virtual representation of the 3D space by a mesh generator/3D scene creator 212. Finally, the mesh and/or 3D scene can be used to generate a full 3D mesh 214, which includes one or more frames from the video 201 (and/or other sources of relevant images) mapped upon the 3D mesh 214 to generate a relatively realistic model. See, e.g., FIG. 4 which shows an image of the light switch object 101 of FIG. 1 with a mesh overlaid. Additionally, an abstract video 216, which may comprise a layout or metaverse model of the scene captured by the camera 111, may be generated from the detected points in the point cloud. The model can then be used in an interactive fashion.

AR data 202 may be captured contemporaneously with and/or extracted from, video 201, and may be tagged to video 201. AR data 202 may include AR feature point data 204, depth data from the sensor 206, motion data from spatial sensors 112 (shown in FIG. 1), predicted depth data 208, and/or disparity maps 210. Other embodiments may include additional data types, different data types, or fewer data types. The various types of AR data 202 may be derived from various raw data inputs, including Red-Green-Blue (RGB) images (such as the sequence of frames of video 201), intrinsic camera parameters and/or camera transform data (such as from camera 111 and/or spatial position sensor 112), 3D feature points, and/or depth images from a depth sensor (LiDAR, stereo camera, etc.), among other types of possible data. RGB images may be extracted from frames of the video captured by camera 111. An RGB image defines red, green, and blue color components for each individual pixel of the image.

Intrinsic parameters of a camera are parameters that are internal and fixed to a particular camera. These parameters characterize the optical, geometric, and digital characteristics of the camera and include: (1) the perspective projection (e.g., focal length), (2) the transformation between image plane coordinates and pixel coordinates, and (3) the geometric distortion introduced by the optics.

In addition to motion data from spatial position sensor 112, intrinsic camera parameters can include various known or readily determined properties of camera 111, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 111 is focused relatively far away from the camera position, and/or the camera 111 utilizes a small aperture (relatively high f-stop, such as f/8, f/11, etc.), so as to offer a large depth of field.

Camera transforms can include the various variables necessary to transform between the 3D objects within the field of view of camera 111 and the 2D image plane of the camera 111. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 112. Depth images can include imaging captured by a depth-sensitive device, such as a LiDAR sensor or infrared range finder, to allow for direct, and potentially more precise, depth measurements of various points within the scene captured by camera 111. Where direct depth measurements are available, data similar to that available for camera 111 may be used (e.g., intrinsic camera parameters and camera transforms) to process the depth measurements and correlate with the images from camera 111.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 112. Identified features including edges, points, and planes may be used to create a 2D or 3D layout and/or metaverse. Further, these feature points may correspond to segmented portions of the captured 3D scene, such as distinguishing a wall, window, picture, or other planar feature from identified planes such as walls, floor, ceiling, etc.

Depth data from sensor 206 may include the direct depth measurements, which may be correlated with identified AR feature point data 204 by the AR API. Corollary to or alternative to depth data from sensor 206 includes predicted depth data 208, which the AR API may derive from techniques such as machine learning, or photogrammetry and comparison between proximate frames of the captured video. The depth data from the sensor 206 and the predicted depth 208 may comprise a point cloud that, when interconnected, comprises a 3D mesh, with the points forming the vertices of the mesh polygons such as triangles.

Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/3D scene creator 212 receives the AR data 202 and uses it to generate a 3D mesh, which may then be output as a full 3D mesh 214 and/or an abstract video 216, or layout and/or metaverse. The resulting output from the mesh generator/3D scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. The full 3D mesh 214 provides a geometric representation of the captured 3D space. The full 3D mesh 214 can be used for various purposes, such as simulating physical interactions with objects in the 3D space represented by the full 3D mesh 214, taking measurements of the represented environment, later exploration or walkthrough, or another suitable purpose.

An abstract video 216 can also be output, which may be or include a virtual representation such as a metaverse, and/or a 2D or 3D layout. As with the full 3D mesh 214, such a layout or virtual representation reflects the physical geometry of the captured 3D space, and may include measurements of the captured space that reflect the actual physical dimension of the captured 3D space. In this respect, the virtual representation/layout/metaverse is equivalent in physical dimensions to the captured 3D space, albeit as a digital representation.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL (hue, saturation, lightness), CMYK (cyan, magenta, yellow, and key), or another method of expressing color, in alternative embodiments. In still other embodiments, the image information may comprise black and white or greyscale information, with no color information. Further still, other embodiments may utilize a combination of color and greyscale/black and white images.

Figure 3:
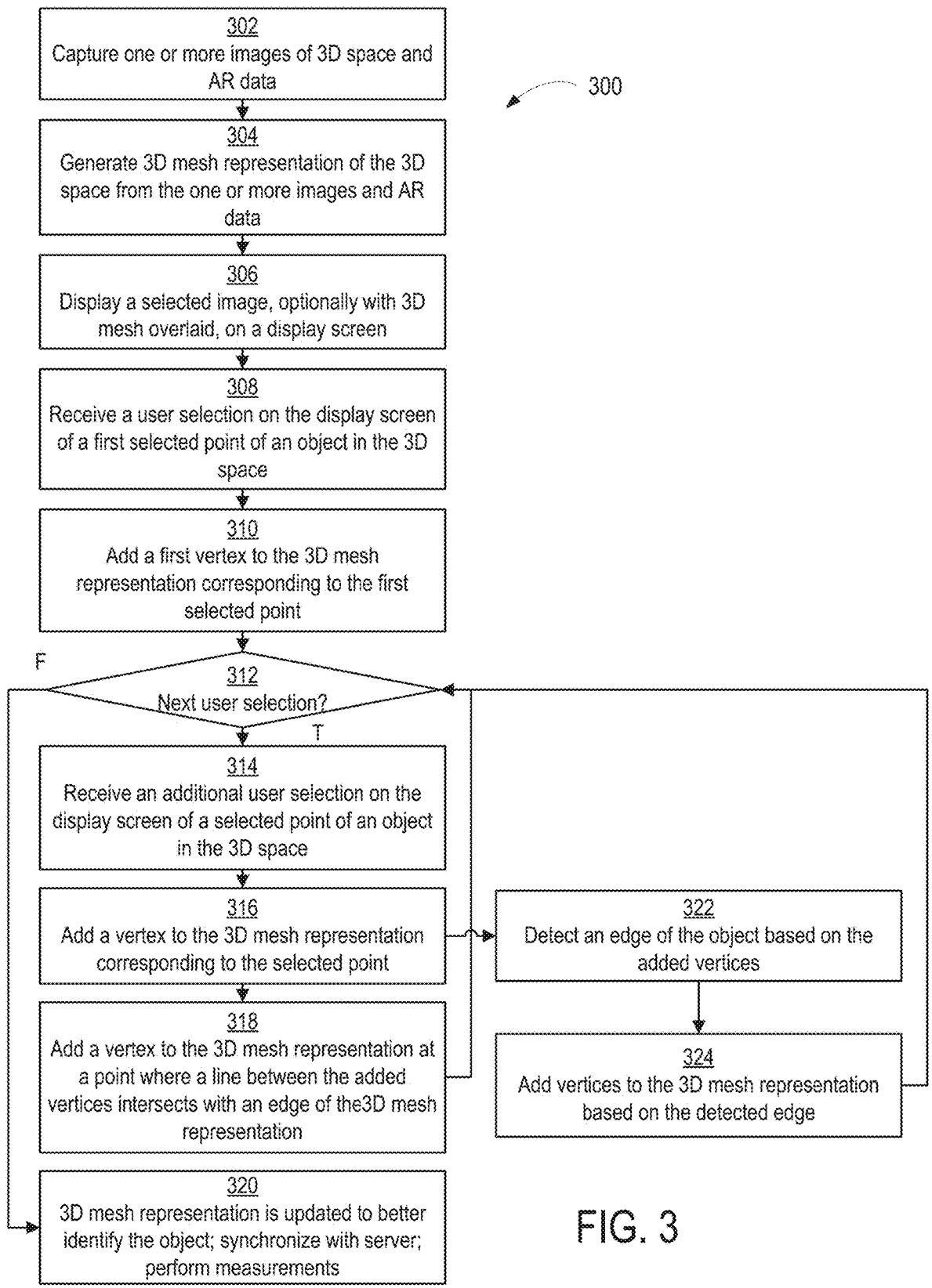
FIG. 3 is a flowchart of the operations of an example method for updating a 3D mesh representation of a 3D space to better identify an object in the space, according to various embodiments.

FIG. 3 is a flowchart of the operations of an example method for updating a 3D mesh representation of a 3D space to better identify an object in the space, according to various embodiments. Various embodiments may implement only some or all of the operations of method 300, and each of the operations of method 300 may be performed in whole or in part. Some embodiments may add or omit additional operations, or may change the order of operations as may be appropriate for a given implementation. Method 300 may be carried out in whole or in part by one or more components of system 100.

In step or operation 302, one or more images, e.g., video, may be captured along with associated AR data, as described above with respect to FIGS. 1 and 2. This can include spatial data such as a point cloud. For example, the video may comprise RGB data and the AR data may comprise depth data. These two types of data can be captured concurrently. The RGB frames can be used to render texture on the mesh model. The captured video may come from a variety of sources. In some examples, a camera attached to or integrated with a capturing device, such as user device 110 with camera 111, is used to capture the video. In other examples, a different device or devices may be used to capture the video that are separate from the capturing device. The AR data may come from, in some examples, other sensors as described above with respect to FIGS. 1 and 2, such as spatial position sensor 112 on a user device 110. In embodiments, the video and AR data are captured contemporaneously to ensure appropriate association between the AR data and corresponding video frames. The video and associated AR data may be captured at a previous time, and stored into an appropriate file format that captures the video along with the raw feature points and motion data. Various operations of method 300 may then be performed on the stored video and associated data in post-processing.

Operation 304 includes generating a 3D mesh representation of the 3D space from the one or more images and AR data. This can involve first obtaining a point cloud of depth data. For example, a cloud of points each with positional data in three dimensions with respect to a predetermined reference, can be obtained from the captured video and possibly AR data, also as described with respect to FIGS. 1 and 2. In some embodiments, operation 304 may be performed at least in part by an AR API located on the capturing device, as discussed above with respect to device 110. The point cloud may further be processed to generate a 3D mesh, such as by repeatedly connecting each of the points in the point cloud into groups of three to form a mesh of triangles. Each of the points then becomes a vertex for one or more triangles, with edges of the various triangles formed by the connection between two adjacent points. In some embodiments, the depth points or the 3D mesh may be at least partially obtained using simultaneous localization and mapping (SLAM), or another suitable technique, which may be carried out on the device by the AR API. SLAM is the computational problem of constructing or updating a map of an unknown environment while simultaneously keeping track of the location of an agent, e.g., camera, within it.

In embodiments where the video is provided as a file from a past capture, the AR feature points may be stored with the video, and correlated to each video frame. In other embodiments, the AR feature points may be calculated from a raw video without associated AR data using photogrammetric techniques.

The mesh may be generated and progressively built as the user moves their device in the 3D space. The mesh can be synchronized to the position of the capturing camera as it is generated with a server or other device via a network such as the Internet.

Operation 306 includes displaying a selected image, optionally with 3D mesh overlaid, on a display screen. See, FIG. 6, for example. The user can review the one or more images which are captured and select one of the images on the user device 110, for example. The user can select an image which clearly shows an object in the 3D space which the user is interested in analyzing such as to obtain its measurements. The user can manipulate the angle of the mesh to obtain a satisfactory view of the light switch object, for instance.

Operation 308 includes receiving a user selection on the display screen of a first selected point of an object in the 3D space. For example, in FIG. 6, the user may touch a point on the display screen which corresponds to a point in the 3D space. In this example, the point which is touched on the display screen is a point with screen coordinates x1,y1. This touched point corresponds to a pixel in the camera sensor. A virtual light ray is cast on a path from the focal point of a camera through the pixel in the camera sensor to determine what is visible along the ray in the 3D space. The depth data of the 3D space is used to identify a point in the 3D space which is intersected by the ray.

The user can touch the screen to select a number of vertices which identify the object. For example, the user may select the four corners of a light switch object to generate corresponding vertices of the object in the mesh.

Operation 310 includes adding a first vertex, e.g., a user-selected vertex, to the 3D mesh representation corresponding to the first selected point. For example, see FIG. 7 and the vertex 710.

A decision step 312 determines whether there is a next user selection on the display screen. If the decision step is true (T), operation 314 is reached. If the decision step is false (F), operation 320 is reached.

Operation 314 includes receiving an additional user selection on the display screen of a selected point of an object in the 3D space. Operation 316 includes adding a vertex to the 3D mesh representation corresponding to the selected point. For example, this could be the second user-selected vertex 805 in FIG. 8 or 9. Operation 318 includes adding a vertex to the 3D mesh representation at a point where a line between the added vertices (e.g., vertices 710 and 805) intersects with an edge of the 3D mesh representation. For example, see the vertices 920, 925 and 930 in FIG. 9. The decision step 312 then follows the operation 318.

In one option, operation 322 follows operation 316. Operation 322 involves detecting an edge of the object based on the added vertices. For example, see the edge represented by the line 810 in FIG. 8. Operation 324 includes adding vertices to the 3D mesh representation based on the detected edge. For example, see the vertices 920, 925 and 930 in FIG. 9. The decision step 312 then follows the operation 324.

Optionally, step 322 could be performed earlier in the process, such as after step 310. In this case, the user selects a single point and the edge detection process identifies an edge which is on or close to that point. In yet another option, the edge detection occurs automatically without a user selection, to identify one or more edges. The mesh triangles are split automatically based on the one or more detected edges.

At operation 320, the method 300 is completed, and the 3D mesh representation has been updated to better identify the object. The operation can further include synchronizing a server or other device with updates to the mesh model. The synchronization can involve sending only the changes to the mesh to the server, in one approach. The changes will be very small in terms of data overhead such that they can be dynamically created or removed at any stage of the process. As mentioned, the new vertices can be added to the mesh by a user at a user device in their home or other location, in which case updates are sent to a remote device such as a server. Or, the new vertices can be added to the mesh by a user at the remote device in which case updates are sent to the local device.

In one approach, a server is to: receive data from a capturing device, where the capturing device is to generate a 3D mesh representation of a three-dimensional (3D) space based on captured video and depth data of the 3D space, and the data represents the 3D mesh representation of the capturing device; synchronize a 3D mesh representation of the 3D space at the server to the 3D mesh representation of the 3D space at the capturing device based on the data; receive additional data from the capturing device identifying a first user-selected vertex of the 3D space; and synchronize the 3D mesh representation of the 3D space at the server to the 3D mesh representation of the 3D space at the capturing device based on the additional data.

The operation 320 can further include performing measurements of the 3D space using the mesh. For example, a straight line or curved line distance can be measured between two points. The curved distance can be a length of a shortest curve across the 3D mesh representation between a first vertex and a second vertex. The area of an object can also be measured. For example, when the vertices of the object represent a rectangle, the area is the height multiplied by the width. The area of more complicated shapes can be determined as well. Generally, the area can be determined when an object is represented by three or more vertices.

The method allows a user to update the 3D mesh representation of an object of interest such as the light switch object 101. For example, the user may desire to obtain the measurements of the light switch object, such as its height and width.

Generally, once an object is better identified in the 3D mesh representation, various measurements can be obtained including the lengths of edges, areas of surfaces, volumes of spaces, distances between objects, and/or any other measurements that could be obtained or approximated from actually measuring the physical 3D space. Thus, the virtual construction approximates or matches the physical size of the captured 3D space. Measurements taken in the virtual construction, which is of an identical scale to the captured 3D space, will be identical, or substantially identical to if such measurements had been made of the actual 3D space using traditional measurement tools such as a ruler.

Depending upon the capabilities of an implementing system or device, operations 304-318 may be performed progressively while the video is being captured, or may be performed on a complete captured video and associated AR data, such as when the user plays back a video of the 3D space on the device 110.

Figure 4:
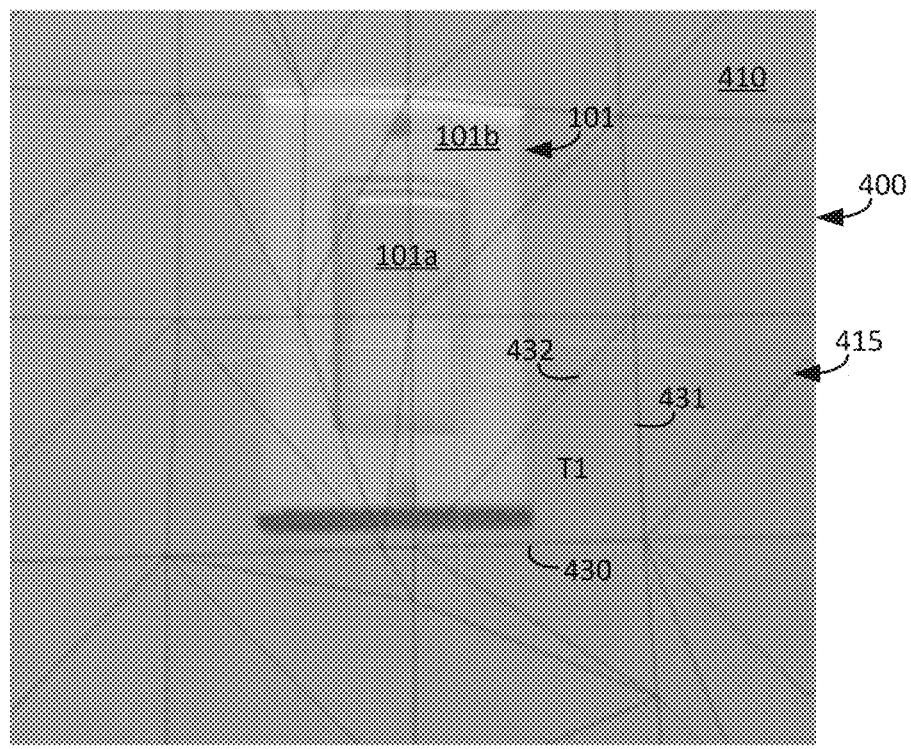
FIG. 4 illustrates an example selected image consistent with operation 306 of FIG. 3, including an overlaid 3D mesh, according to various embodiments.

FIG. 4 illustrates an example selected image consistent with operation 306 of FIG. 3, including an overlaid 3D mesh 415, according to various embodiments. The image 400 depicts the light switch object 101 of the 3D space 105 of FIG. 1. The light switch object 101 includes a switch 101a and a face plate 101b. A background wall area 410 is also depicted. The mesh is represented by various triangles. An example triangle T1 includes edges 430, 431 and 432.

Figure 5:
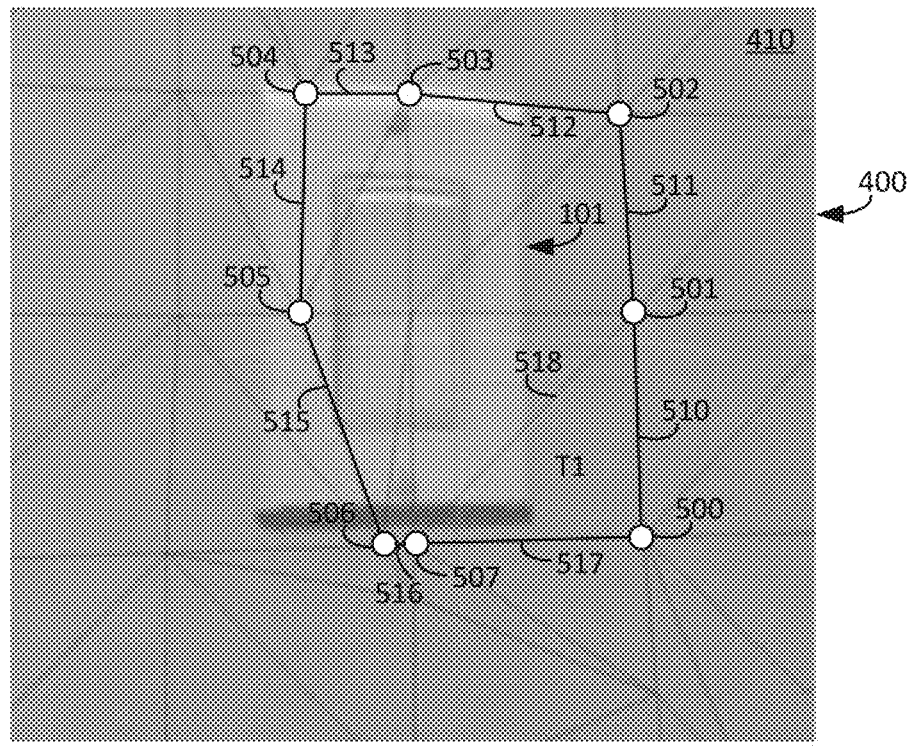
FIG. 5 illustrates a representation of the object of FIG. 4 in the 3D mesh, according to various embodiments.

FIG. 5 illustrates a representation of the object of FIG. 4 in the 3D mesh, according to various embodiments. If the light switch object were to be represented by the existing mesh, it would be represented by the vertices which most closely match the shape of the light switch object. For example, vertices 500-507 could be used. The vertices are connected by edges 510-517 which provide an outline of the object. Note the example triangle T1 which is bounded by edges 510, 517 and 518. The outline is clearly inaccurate in describing the edges of the light switch object using the existing vertices of the mesh. With the techniques described herein, a user can add vertices to the mesh to better describe an object of interest.

As seen in the image of the light switch object, the mesh edges and vertices generally do not correspond to the shape of the light switch object. One reason is that the light switch object has essentially the same depth as the surrounding wall so it is hard to distinguish from the wall. Another reason is the complexity, e.g., density/accuracy, of the mesh. In general, without additional information to help create the mesh, the edges and vertices on the mesh are fairly random, and rarely align well with the contour of the objects. The techniques described herein model the 3D space with minimal complexity while keeping the most meaningful geometry information, such as the shape of the object. The techniques allow the user to provide inputs to the mesh algorithm to better identify the object so that the mesh has vertices and edges which are aligned with the object.

Figure 6:
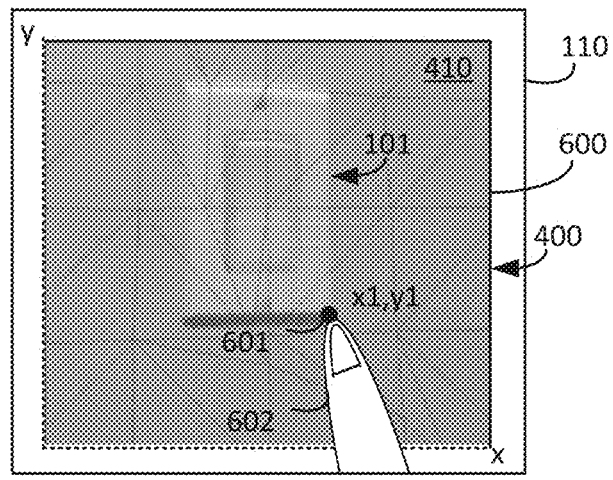
FIG. 6 illustrates an example user selection on a display screen consistent with step 308 in FIG. 3 and the object of FIG. 4, according to various embodiments.

FIG. 6 illustrates an example user selection on a display screen consistent with step 308 in FIG. 3 and the object of FIG. 4, according to various embodiments. In this example, the display screen 600 is a touch screen of the user device 110 in which the user can select a point 601 on the screen by touching it with a finger 602. In the image 400, the point is represented by a screen coordinate x1,y1 relative to horizontal x and vertical y axes of the device 110. In this example, the point is on a corner of the light switch object, e.g., a corner of the face plate. The user may plan to touch each corner of the light switch object to better define this object in the 3D mesh. The user may plan to define the switch and/or the face plate.

Note that in addition to selecting the corners of the object, the user could select other points of interest. For example, the user could select a midpoint of the object. In some cases, the user can select one or more corners, edges or other points, where an edge detection process subsequently uses the select points to detect an outline or other features of the object.

Figure 7:
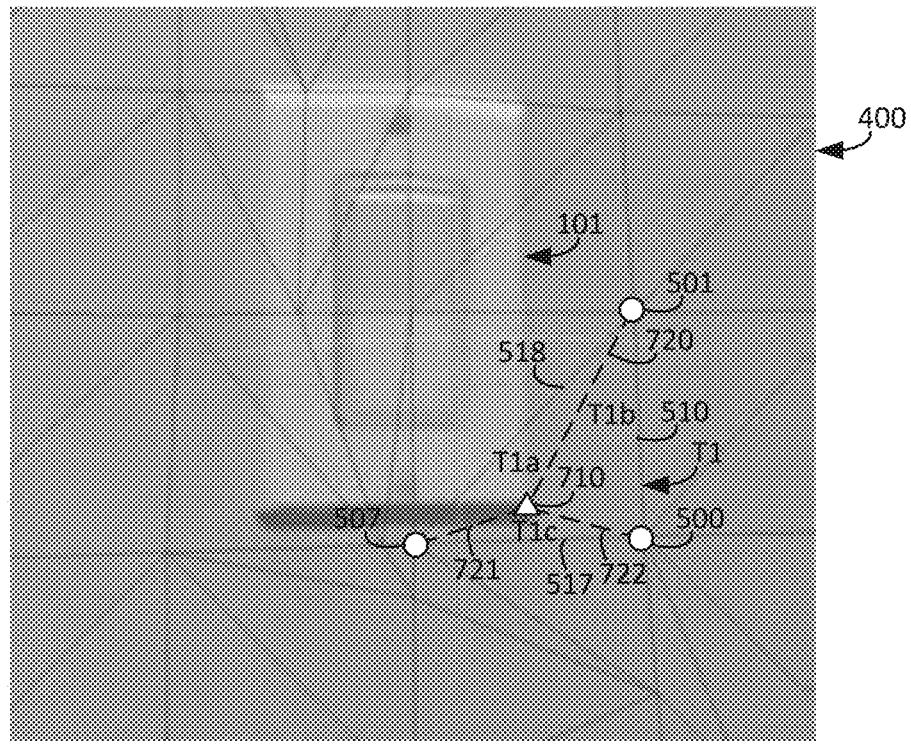
FIG. 7 illustrates an example of a vertex added to a 3D mesh consistent with step 316 in FIG. 3 and with the user selection of FIG. 6, according to various embodiments.

As mentioned, the selected point corresponds to a pixel in the image 400, and this point in turn can be associated with a corresponding point in the 3D space using ray casting. Note that instead of touching the screen with a finger, other approaches can be used for selecting a point in the image. For example, the user may touch the screen with a stylus. In another approach, the user may enter a command using a mouse or other input device to select a point. Moreover, the display screen can be a different device than an interface device, e.g., a mouse, which is used for receiving a user selection of a selected point on the display screen. The display screen can be the same as or different than the user device 110 which holds the camera, e.g., capturing device. Based on the user's selection, a vertex 710 is added to the mesh model of the 3D space, as depicted in FIG. 7. The vertex can be added using ray casting and an AR API such as discussed above.

FIG. 7 illustrates an example of a vertex added to a 3D mesh consistent with step 316 in FIG. 3 and with the user selection of FIG. 6, according to various embodiments. The added vertex, or first vertex 710, is a point in the 3D mesh model which corresponds to the point selected by the user in the display device of FIG. 6. The vertex is within the face of the triangle T1 of the mesh, rather than on an edge of the mesh, in this example. The vertex is represented by a triangle in this situation. The first vertex 710 is at the lower right hand corner of the light switch object.

If the point in the 3D mesh model is within a specified threshold distance from a closest edge it may be considered to be on the edge rather than within the face. The threshold distance may be an increasing function of the distance of the object from the camera and a decreasing function of the resolution of the mesh. That is, a smaller threshold distance can correspond to a higher resolution or smaller average mesh triangle size or smaller average distance between vertices. If the point in the 3D mesh model is not within a specified threshold distance from an edge, it may be considered to be within the face rather than on the edge.

In one approach, if the first selected point corresponds to a position within a face of a triangle of the 3D mesh representation, the updating of the mesh comprises dividing the triangle into multiple, e.g., three new triangles which share the first vertex. If the first selected point corresponds to an edge of a face of the 3D mesh representation, the updating comprises dividing the face into two new faces which share the first vertex.

For instance, the triangle T1 is bounded by the edges 510, 517 and 518. The triangle T1 is divided into three smaller triangles T1a, T1b and T1c since the vertex is on the face of a triangle. New edges 720, 721 and 722 are created which connect the vertex 710 to the three closest vertices, namely vertices 501, 507 and 500, respectively. Triangle T1a is defined by vertices 501, 507 and 710 and bounded by edges 518, 720 and 721. Triangle T1b is defined by vertices 500, 501 and 710 and bounded by edges 510, 720 and 722. Triangle T1c is defined by vertices 500, 507 and 710 and bounded by edges 517, 721 and 722.

Figure 8:
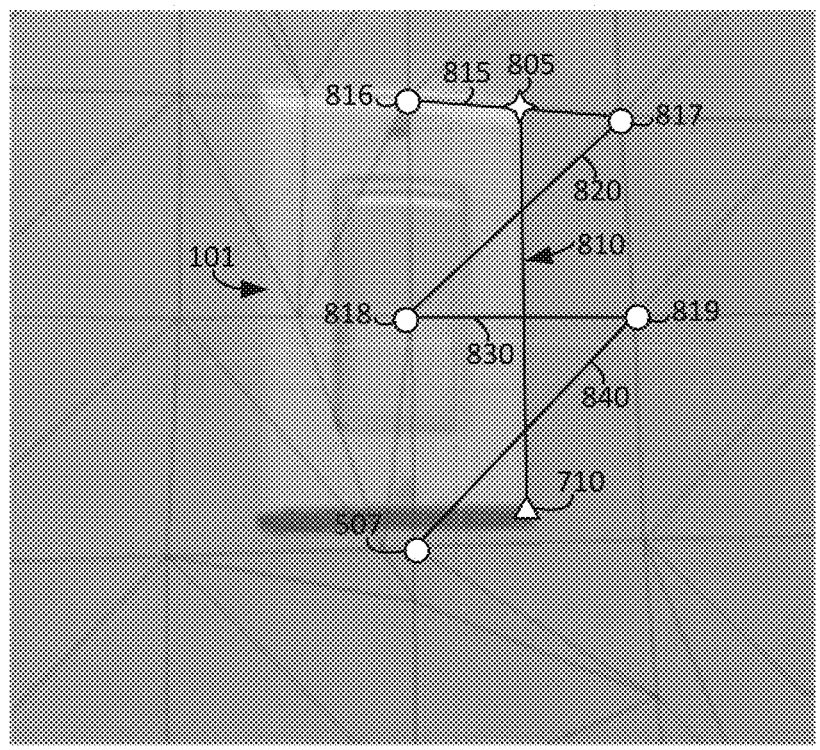
FIG. 8 illustrates an example of a straight line between two vertices added to a 3D mesh, consistent with operation 318 in FIG. 3 and the object of FIG. 4, according to various embodiments.

FIG. 8 illustrates an example of a straight line 810 between two vertices added to a 3D mesh, consistent with operation 318 in FIG. 3 and the object of FIG. 4, according to various embodiments. This example can follow the example of FIG. 7. Here, the user has selected a second point on the display screen which corresponds to a second vertex 805 at the upper right hand corner of the light switch object 101. This is in addition to the first vertex 710 at the lower right hand corner of the light switch object. A straight line 810 is drawn between these two vertices. The second vertex 805 is on an existing edge 815 of the mesh. The vertex is shown as a four pointed star in this situation. The edge 815 extends between vertices 816 and 817. Additionally, the straight line 810 intersects with three edges of the mesh, i.e., edges 820, 830 and 840. The edge 820 extends between vertices 817 and 818. The edge 830 extends between vertices 818 and 819. The edge 840 extends between vertices 507 and 819. New vertices can be provided at these intersections, as depicted in FIG. 9.

Figure 9:
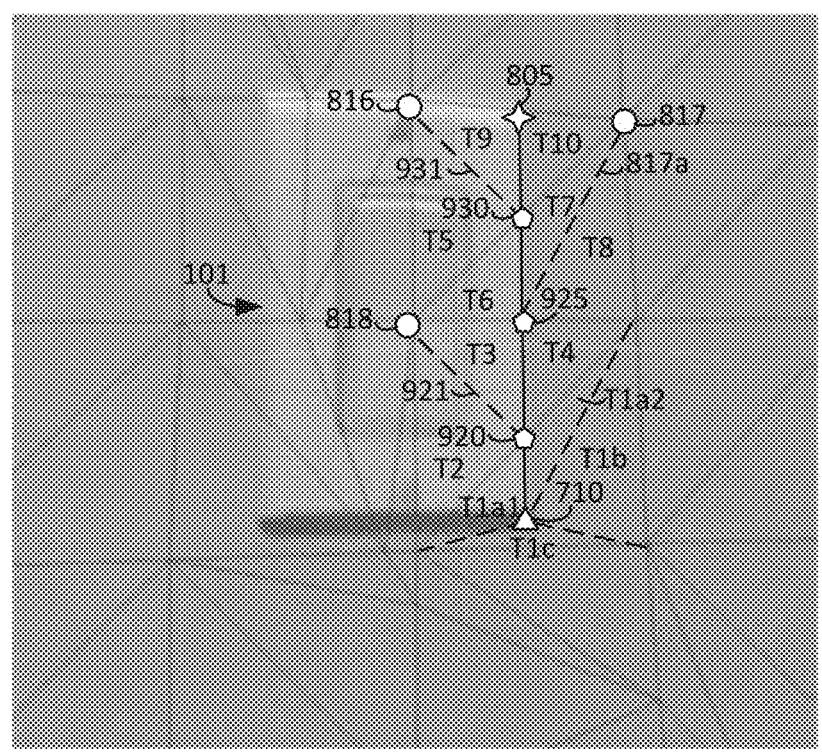
FIG. 9 illustrates an example of vertices added to a 3D mesh where the straight line of FIG. 8 intersects edges of the 3D mesh, consistent with operation 318 in FIG. 3, and according to various embodiments.

FIG. 9 illustrates an example of vertices added to a 3D mesh where the straight line of FIG. 8 intersects edges of the 3D mesh, consistent with operation 318 in FIG. 3, and according to various embodiments. The new vertices at the intersection of the straight line 810 and the existing edges are shows by pentagons and include vertices 920, 925 and 930. Each of these new vertices is connected to an existing vertex and divides an existing triangle of the mesh into one or more new triangles. For example, the vertex 930 is connected to the vertex 816 by a new edge 931, the vertex 925 is connected to the vertex 817 by a new edge 817a and the vertex 920 is connected to the vertex 818 by a new edge 921. The new edges result in new triangles including triangles T1a1 and T1a2 (formed by splitting T1a in FIGS. 7), and T2-T10.

Note that for the vertex 805 on the edge 815 of the mesh, two new triangles T9 and T10 are created.

The user-selected vertices 710 and 805 thus lead to the automatic creation of vertices 920, 925 and 930 and associated triangles in the 3D mesh.

Figure 10:
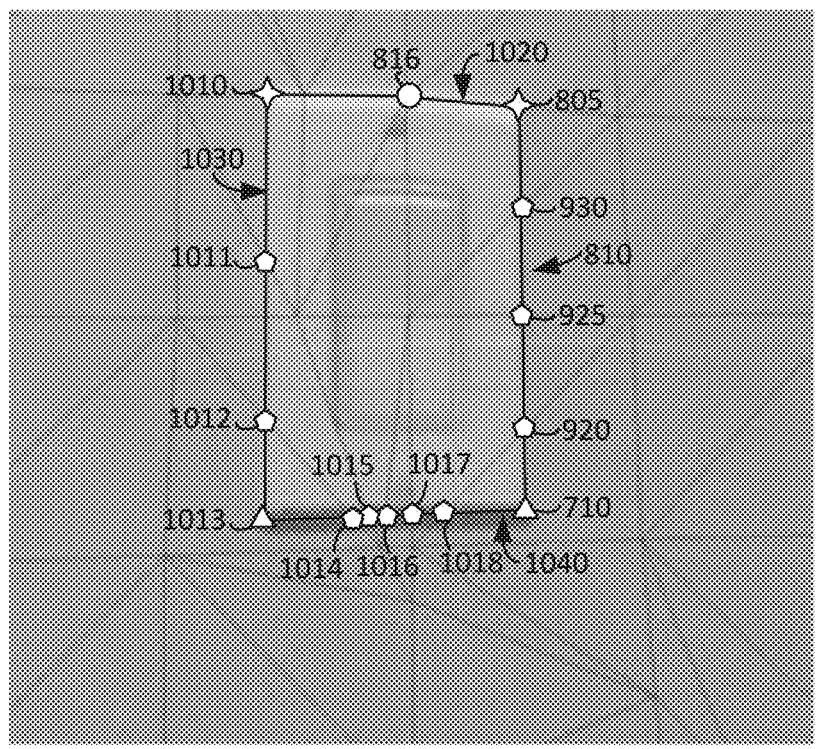
FIG. 10 illustrates an example of vertices added to a 3D mesh, consistent with operation 318 in FIG. 3, and following the configuration of FIG. 9, according to various embodiments.

FIG. 10 illustrates an example of vertices added to a 3D mesh, consistent with operation 318 in FIG. 3, and following the configuration of FIG. 9, according to various embodiments. This example follows the example of FIG. 9, where the user further defines new vertices, e.g., a third vertex 1010 and a fourth vertex 1013. A straight line 1020 is drawn between the vertices 805 and 1010. In this example, the line goes through vertex 816. A straight line 1030 is drawn between the vertices 1010 and 1013. This results in new vertices 1011 and 1012 at points where the line intersects with existing edges of the mesh. A straight line 1040 is drawn between the vertices 1013 and 710. This results in new vertices 1014-1018 at points where the line intersects with existing edges of the mesh. The lines 810, 1020, 1030 and 1040 accurately outline the light switch object. This approach provides a simple rectangular shape to accurately represent the light switch object, to provide advantages such as allowing accurate measurements of the light switch object.

Figure 11:
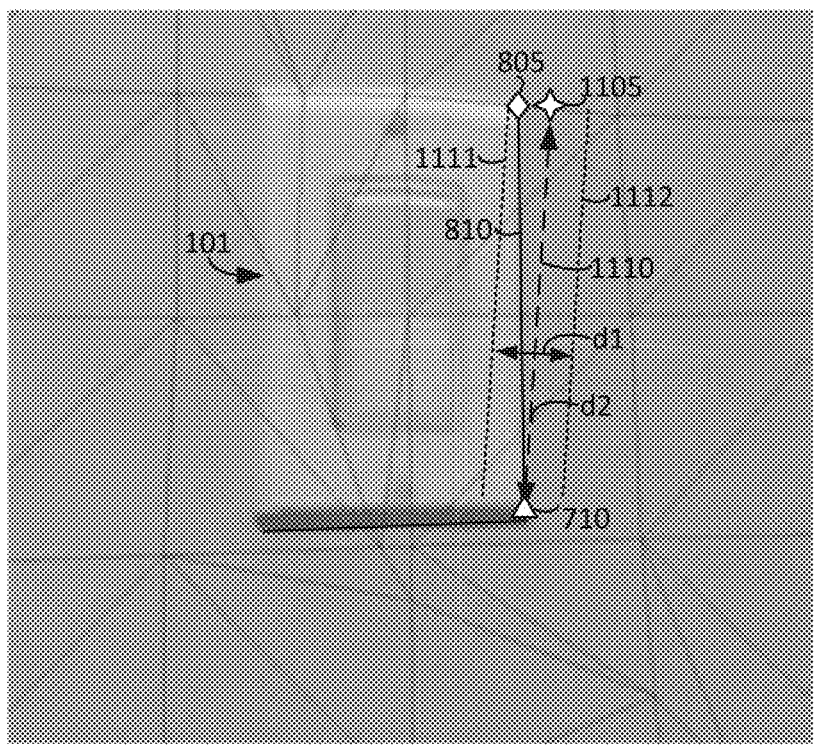
FIG. 11 illustrates an example of a detected edge of an object and an added vertex of a 3D mesh consistent with operations 322 and 324 in FIG. 3, and according to various embodiments.

FIG. 11 illustrates an example of a detected edge of an object and an added vertex of a 3D mesh consistent with operations 322 and 324 in FIG. 3, and according to various embodiments. In this example, instead of selecting a point on the display screen which corresponds to the vertex 805, the user selects a point on the display screen which corresponds to the vertex 1105, which is offset from the actual location of the corner of the light switch object. A straight line 1110 is drawn between the user-selected vertices 710 and 1105. The system can remedy this error by performing an edge detection process which is guided by the user-selected vertices. For example, the edge detection process may search within a range d which is centered on the line 1110, for an edge of the light switch object. This search area is bounded by the lines 1111 and 1112. Furthermore, the range d1 can be an increasing function of the distance between the vertices 710 and 805, the length of the line 1110. In one approach the edge is detected within a range centered on a line between the first vertex and the second vertex, and the range is an increasing function of a distance d2 between the first vertex and the second vertex.

Figure 12:
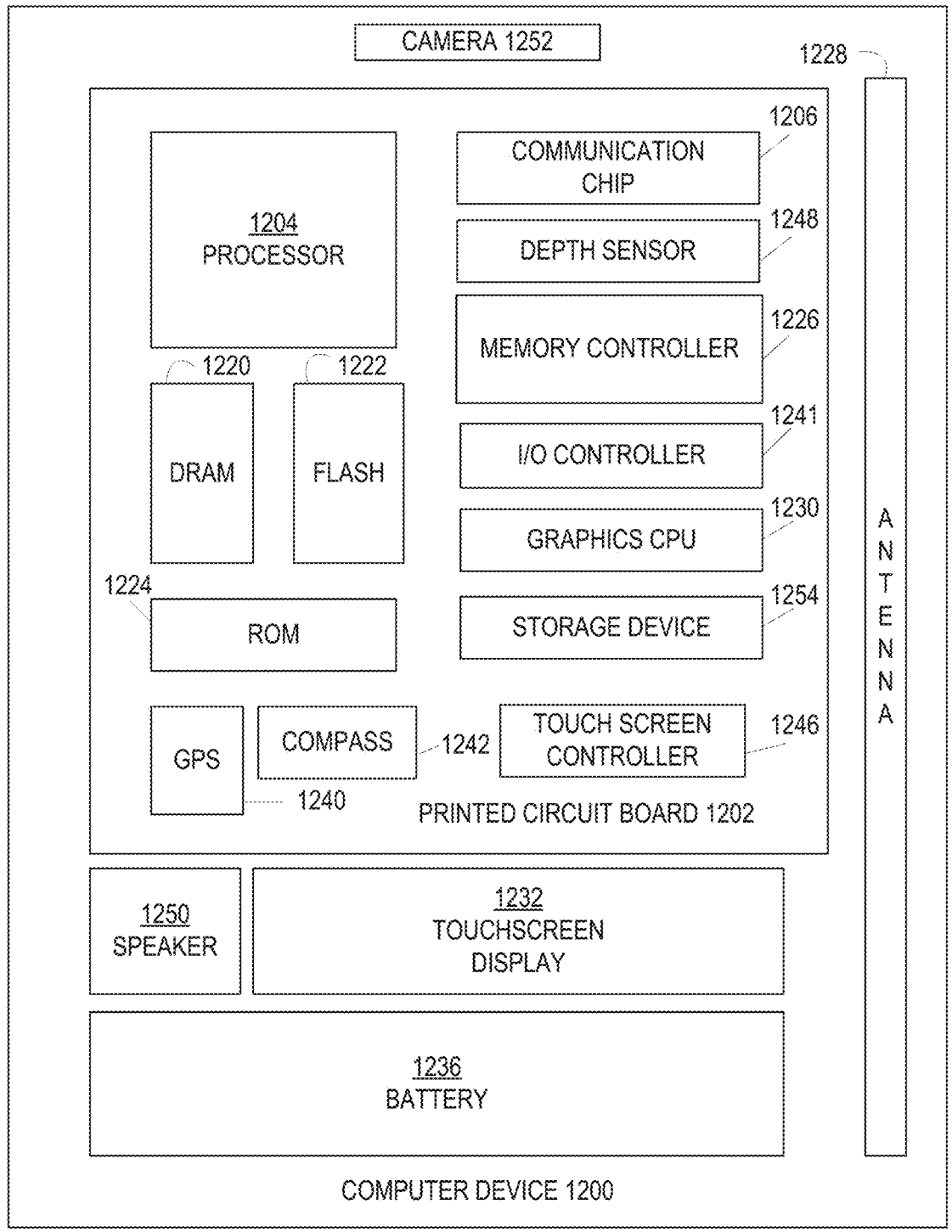
FIG. 12 is a block diagram of an example computer that can be used to implement some or all of the components of the disclosed systems and methods, according to various embodiments.

FIG. 12 illustrates an example computer device 1200 that may be employed by the apparatuses and/or methods described herein, in accordance with various embodiments. As shown, computer device 1200 may include a number of components, such as one or more processor(s) 1204 (one shown) and at least one communication chip 1206. In various embodiments, one or more processor(s) 1204 each may include one or more processor cores. In various embodiments, the one or more processor(s) 1204 may include hardware accelerators to complement the one or more processor cores. In various embodiments, the at least one communication chip 1206 may be physically and electrically coupled to the one or more processor(s) 1504. In further implementations, the communication chip 1206 may be part of the one or more processor(s) 1204. In various embodiments, computer device 1500 may include printed circuit board (PCB) 1202. For these embodiments, the one or more processor(s) 1204 and communication chip 1206 may be disposed thereon. In alternate embodiments, the various components may be coupled without the employment of PCB 1202.

Depending on its applications, computer device 1200 may include other components that may be physically and electrically coupled to the PCB 1202. These other components may include, but are not limited to, memory controller 1226, volatile memory (e.g., dynamic random access memory (DRAM) 1220), non-volatile memory such as read only memory (ROM) 1224, flash memory 1222, storage device 1254 (e.g., a hard-disk drive (HDD)), an I/O controller 1241, a digital signal processor (not shown), a crypto processor (not shown), a graphics processor 1230, one or more antennae 1228, a display, a touch screen display 1232, a touch screen controller 1546, a battery 1236, an audio codec (not shown), a video codec (not shown), a global positioning system (GPS) device 1240, a compass 1242, an accelerometer (not shown), a gyroscope (not shown), a depth sensor 1248, a speaker 1250, a camera 1252, and a mass storage device (such as hard disk drive, a solid state drive, compact disk (CD), digital versatile disk (DVD)) (not shown), and so forth.

In some embodiments, the one or more processor(s) 1204, flash memory 1222, and/or storage device 1254 may include associated firmware (not shown) storing programming instructions configured to enable computer device 1200, in response to execution of the programming instructions by one or more processor(s) 1204, to practice all or selected aspects of process flow 200 or method 300, as described herein. In various embodiments, these aspects may additionally or alternatively be implemented using hardware separate from the one or more processor(s) 1204, flash memory 1222, or storage device 1254.

The communication chips 1206 may enable wired and/or wireless communications for the transfer of data to and from the computer device 1200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1206 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1200 may include a plurality of communication chips 1206. For instance, a first communication chip 1206 may be dedicated to shorter range wireless communications such as Wi-Fi and Bluetooth, and a second communication chip 1206 may be dedicated to longer range wireless communications such as GPS, EDGE, GPRS, CDMA, WiMAX, LTE, Ev-DO, and others.

In various implementations, the computer device 1200 may be a laptop, a netbook, a notebook, an ultrabook, a smartphone, a computer tablet, a personal digital assistant (PDA), a desktop computer, smart glasses, or a server. In further implementations, the computer device 1200 may be any other electronic device or circuit that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 13:
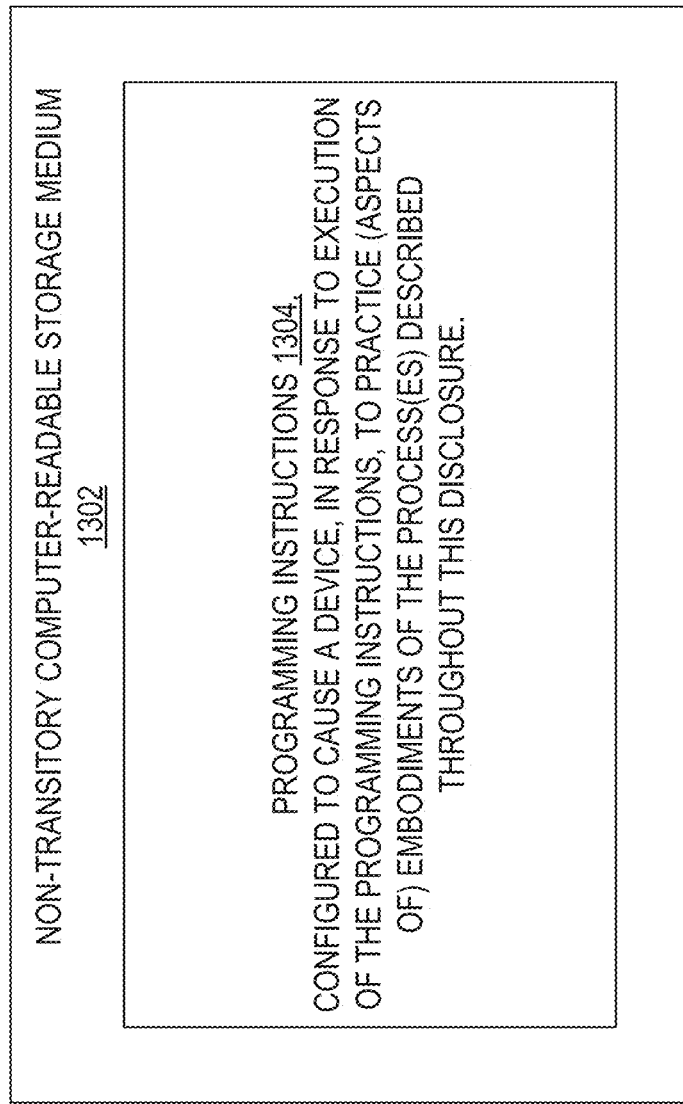
FIG. 13 is a block diagram of a computer-readable storage medium that can be used to implement some of the components of the system or methods disclosed herein, according to various embodiments.

FIG. 13 illustrates an example computer-readable non-transitory storage medium that may be suitable for use to store instructions that cause an apparatus, e.g., a processor or other circuit, in response to execution of the instructions by the apparatus, to practice selected aspects of the present disclosure. As shown, non-transitory computer-readable storage medium 1302 may include a number of programming instructions 1304. Programming instructions 1304 may be configured to enable a device, e.g., computer 1200, in response to execution of the programming instructions, to implement (aspects of) process flow 200 and method 300, as described above. In alternate embodiments, programming instructions 1304 may be disposed on multiple computer-readable non-transitory storage media 1302 instead. In still other embodiments, programming instructions 1304 may be disposed on computer-readable transitory storage media 1302, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
    capturing, with a capturing device, one or more images and depth information of a three-dimensional (3D) space;
    generating, from the one or more images and depth information, a 3D mesh representation of the 3D space, including an object in the 3D space;
    displaying, with a display screen, a selected image of the one or more images overlaid with the 3D mesh representation of the 3D space, wherein the selected image includes the object;
    receiving, via an interface, a selection of a first selected point of the object on the display screen; and
    updating the 3D mesh representation of the 3D space in response to the selection of the first selected point, wherein the updating comprises adding a first vertex to the 3D mesh representation at a location in the 3D space corresponding to the first selected point on the display screen.

2. The method of claim 1, wherein the first vertex is a point in the 3D mesh representation intersected by a ray cast from the first selected point.

3. The method of claim 1, further comprising transmitting data identifying the first vertex to a server, to synchronize a 3D mesh representation at the server with the 3D mesh representation of the capturing device.

4. The method of claim 1, wherein:
    the first selected point corresponds to a position within a face of a triangle of the 3D mesh representation; and
    the updating comprises dividing the triangle into multiple new triangles which share the first vertex.

5. The method of claim 1, wherein:
    the first selected point corresponds to an edge of a face of the 3D mesh representation; and
    the updating comprises dividing the face into two new faces which share the first vertex.

6. The method of claim 1, wherein:
the 3D mesh representation comprises triangles;
the first selected point corresponds to a position within a triangle of the 3D mesh representation; and
the updating comprises dividing the triangle into three new triangles which share the first vertex.

7. The method of claim 1, further comprising:
receiving, via the interface, a selection of a second selected point on the display screen; and
updating the 3D mesh representation of the 3D space in response to the selection of the second selected point, the updating the 3D mesh representation of the 3D space in response to the selection of the second selected point comprises adding a second vertex to the 3D mesh representation at a location in the 3D space corresponding to the second selected point on the display screen.

8. The method of claim 7, wherein the updating the 3D mesh representation of the 3D space in response to the selection of the second selected point comprises adding a vertex to the 3D mesh representation at a point where a line between the first vertex and the second vertex intersects with an edge of the 3D mesh representation.

9. The method of claim 7, further comprising:
receiving, via the interface, a selection of a third selected point on the display screen;
adding a third vertex to the 3D mesh representation at a location in the 3D space corresponding to the third selected point on the display screen; and
measuring an area of a polygonal object in the 3D space, wherein the polygonal object is defined by at least the first vertex, the second vertex and the third vertex.

10. The method of claim 7, further comprising performing an edge detection process to detect an edge of an object in the 3D space based on the first vertex and the second vertex.

11. The method of claim 10, further comprising adding a vertex to the 3D mesh representation at a point where the edge of the object intersects with an edge of the 3D mesh representation.

12. The method of claim 10, wherein the edge is detected within a range centered on a line between the first vertex and the second vertex, and the range is an increasing function of a distance between the first vertex and the second vertex.

13. The method of claim 1, wherein the first selected point corresponds to an edge or corner of the object.

14. A non-transitory computer readable medium (CRM) comprising instructions that, when executed by an apparatus, cause the apparatus to:
display, with a display screen, a selected image of one or more images of a three-dimensional (3D) space, wherein the selected image includes an object in the 3D space;
receive, via an interface, a selection of a first selected point on the display screen; and
add a first vertex which corresponds to the first selected point to a 3D mesh representation of the 3D space, wherein;
the object is represented in the 3D mesh representation by vertices which most closely match a shape of the object; and
the adding of the first vertex to the 3D mesh representation increases an accuracy with which the shape of the object is represented in the 3D mesh representation.

15. The CRM of claim 14, wherein:
the 3D mesh representation comprises triangles;
when the first selected point corresponds to a position within a triangle of the 3D mesh representation, the instructions are to further cause the apparatus to divide the triangle into three new triangles which share the first vertex; and
when the first selected point corresponds to an edge of a triangle of the 3D mesh representation, the instructions are to further cause the apparatus to divide the triangle into two new triangles which share the first vertex.

16. The CRM of claim 14, wherein the instructions are to further cause the apparatus to:
receive, via the interface, a selection of a second selected point on the display screen;
add a second vertex to the 3D mesh representation of the 3D space, wherein the second vertex corresponds to the second selected point according to an intersection of the 3D mesh representation with a ray cast from the second selected point; and
add a vertex to the 3D mesh representation at a point where a line between the first vertex and the second vertex intersects with an edge of the 3D mesh representation.

17. The CRM of claim 16, wherein the instructions are to further cause the apparatus to:
receive, via the interface, a selection of a third selected point on the display screen;
add a third vertex to the 3D mesh representation of the 3D space, wherein the third vertex corresponds to the third selected point according to an intersection of the 3D mesh representation with a ray cast from the third selected point; and
measure an area of a polygonal object in the 3D space, wherein the polygonal object is defined by at least the first vertex, the second vertex and the third vertex.

18. The CRM of claim 16, wherein the instructions are to further cause the apparatus to:
measure at least one of a straight line distance between the first vertex and the second vertex or a length of a shortest curve across the 3D mesh representation between the first vertex and the second vertex.

19. The CRM of claim 14, wherein the selected image is displayed on the display screen overlaid with the 3D mesh representation of the 3D space.

20. A system, comprising:
a server with a processor; and
a storage device in communication with the server, wherein the storage device includes instructions that, when executed by the processor, cause the server to:
receive data from a capturing device, wherein the capturing device is to generate a 3D mesh representation of a three-dimensional (3D) space based on captured video and depth data of the 3D space, and the data represents the 3D mesh representation including vertices which represent an edge of an object in the 3D space;
synchronize a 3D mesh representation of the 3D space at the server to the 3D mesh representation of the 3D space at the capturing device based on the data, wherein the 3D mesh representation of the 3D space at the server includes a plurality of vertices which represent the edge of the object in the 3D space;
receive additional data from the capturing device identifying a first user-selected vertex of the 3D space; and
update the 3D mesh representation of the 3D space at the server to add the first user-selected vertex to the plurality of vertices in the 3D mesh representation of the 3D space, and to represent the edge of the object in the 3D space with the first user-selected vertex in place of one of the plurality of vertices.

21. The system of claim 20, wherein:
when the first user-selected vertex is within a face of the 3D mesh representation, to update the 3D mesh representation of the space at the server, the server is to divide the face into multiple new faces which share the first user-selected vertex; and
when the first user-selected vertex is on an edge of a face of the 3D mesh representation, to update the 3D mesh representation of the space at the server, the server is to divide the face into two new faces which share the first user-selected vertex.

* * * * *